Sept. 4, 1951 C. P. LEESE 2,566,494
HOT BOX ALARM DEVICE
Filed Dec. 13, 1946
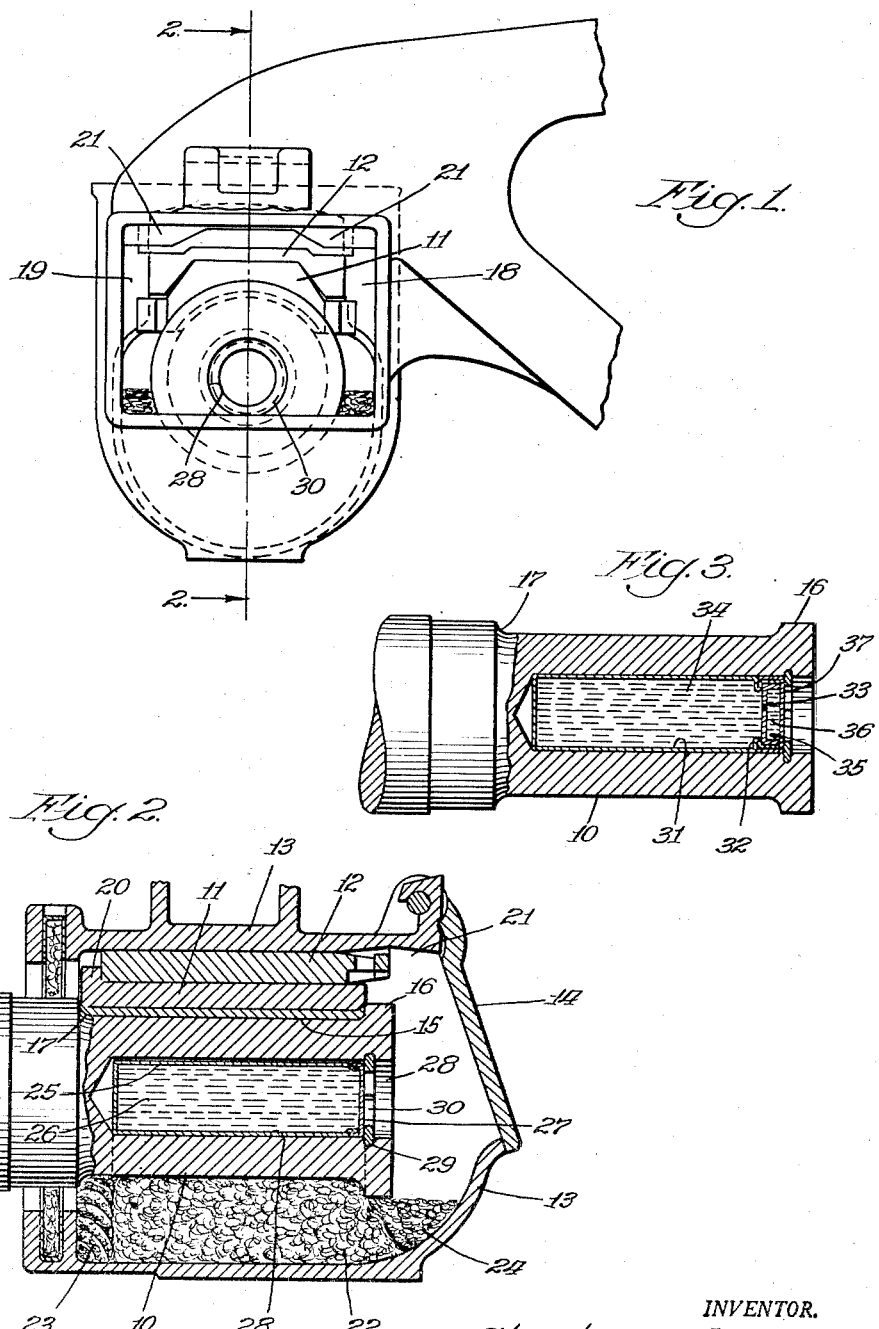
INVENTOR.
Charles P. Leese
BY
Harvey M. Gillespie
Atty.

Patented Sept. 4, 1951

2,566,494

UNITED STATES PATENT OFFICE 2,566,494

HOTBOX ALARM DEVICE

Charles P. Leese, Chicago, Ill., assignor to Standard Car Truck Company, Chicago, Ill., a corporation of New Jersey Application December 13, 1946, Serial No. 716,101

3 Claims. (Cl. 308—38)

This invention relates to improvements in hot box alarm devices adapted for use on railway car journal bearings. The invention has to do particularly with means for giving a signal to indicate the location of an overheated journal bearing and to also initiate emergency treatment of the bearing to prevent injury thereof.

A principal object of the invention is to provide, in an alarm device of the above character, an improved means for storing an auxiliary supply of lubricant so that it will be available for emergency treatment of an overheated journal bearing.

Another object is to provide, in an alarm device of the above character, an improved means for storing an auxiliary supply of lubricant which will be automatically released for application to a car journal and its bearing when such journal or its bearing becomes heated to a predetermined temperature.

A more specific object of the invention is to provide a vessel made, in whole or in part, of a material which fuses at low temperatures and is adapted to contain an auxiliary supply of lubricant, which vessel is so arranged relative to a journal or its bearing element that the temperature of the journal or its bearing, when overheated, will function to melt or rupture the low fusion material of the vessel and thereby release the lubricant for application to the overheated bearing surfaces.

A further object includes the provision of a closed vessel which is made, in whole or in part, of a low temperature fusion metal and contains a quantity of lubricant and an odoriferous substance; the fusion point of the vessel being such that the temperature of the bearing, when it is overheated, will melt the low fusion material and thereby release the lubricant for application to the heated bearing and also release the odoriferous substance to provide an odor indicator that a journal bearing is overheated. The odor is sufficiently prominent to direct attention of the train crew to the location of the bearing so that the cause of the overheating may be removed before the bearing is seriously injured.

The invention is intended to extend to the provision of auxiliary lubricant supplies in which odoriferous and smoke producing material either singly or as a mixture are introduced into the lubricant or are contained in a separate compartment so as to be released when the journal bearing becomes heated to a predetermined temperature.

The invention is illustrated in connection with two specific forms of storage vessels for containing an auxiliary supply of lubricant and such other odoriferous and smoke producing substances as may be desired.

Fig. 1 is a fragmentary side view of a railway car journal box with the hinged cover of the box broken away to show the position of the journal and its bearing member.

Fig. 2 is a vertical section taken on line 2—2 of Fig. 1 and showing one construction and arrangement of a vessel within an end portion of an axle journal for containing an auxiliary supply of lubricant adapted to be released when the journal is heated to a predetermined temperature.

Fig. 3 is a fragmentary sectional view of an axle journal such as shown in Fig. 2 but illustrates a modified form of vessel for containing an auxiliary supply of lubricant and a supply of signal material adapted to be released when the journal is heated to a predetermined temperature. The signal material may be such as will produce an odoriferous or a visual signal, or both.

The journal bearing structure comprises an axle journal 10, a journal bearing 11, and a bearing wedge 12, the latter of which is interposed between the bearing member 11 and the top portion of a journal box 13. The journal box 13 is normally closed by a hinged lid 14, but this element is broken away in Fig. 1 of the drawing to show the arrangements of the journal 10, the journal bearing 11 and the wedge member 12. The journal bearing 11 may be of the usual construction and includes a brass casting provided with a lining 15 of lead or other suitable bearing material, which lining seats on the journal 10 between the collar 16 at one end and the fillet 17 at the other end of the journal.

The opposite sides of the journal bearing 11 fit over the bearing brass 11 and engage vertical guide ribs 18—18 formed on the opposed inner side faces of the journal box 13. Lugs 19—19 on the said bearing 11 engage the forward faces of the guide ribs 18 to hold the bearing 11 in position. The inner end of the wedge engages an upstanding collar portion 20 formed on the bearing 11 and the other end of the wedge is positioned back of a lug 21 located near the open side of the journal box.

Lubricant is applied to the journal 10 and to the journal bearing 11 by means of a body of lubricant saturated material 22 which is located in the bottom portion of the journal box so as to press resiliently against the bottom and side portions of the journal. The material herein shown is the standard wool waste impregnated with oil. However, a lubricant applicator of any other suitable material may be used instead of the standard packing shown.

When the standard wool waste packing is used, a body of the material is usually formed into a roll 23 and is applied so as to engage the inner fillet portion 17 of the journal. A body of the material, for example the body 22, is positioned beneath the journal so as to extend upwardly at the sides of the journal to a position near, but preferably slightly below the center of the journal. A wedge 24 of the packing material is then positioned in the forward portion of the box to prevent cinders or grit from finding entrance to the main body 22 of the lubricant applying material.

When it is known that a journal bearing of a railway car truck is overheated, the overheated bearing can be treated temporarily by pouring a quantity of oil over the bearing and journal. This oil serves to flush off any grit present on the journal and to cool the journal and bearing until the train reaches a terminal or other location where the journal box can be repacked and lubricated. While it is possible to treat an overheated journal bearing in the above manner, and thereby avoid serious damage to the bearing, the overheated condition may not become known until after serious damage to the bearing surfaces have occurred.

It is the purpose of the present invention to provide improvements which will function automatically to apply a quantity of lubricant to the journal and bearing when they become overheated and to also give a suitable signal to notify the train operating crew that the bearing is running hot.

The above results are accomplished in the present invention by the provision of a closed vessel 25 which is filled with an auxiliary supply of lubricant 26. The vessel 25 may be made of any suitable material but is provided at some portion thereof with a material which will fuse at a low temperature, for example a temperature approximately 300° Fahrenheit. It has been found that a journal bearing can be heated to 300° Fahrenheit without serious damage. However, when the temperature of the journal or bearing rises above that temperature there is danger of serious injury. Consequently the low fusion material is preferably such that it will melt at approximately 300° Fahrenheit and thereby release the auxiliary supply of lubricant.

In the embodiment shown in Figs. 1 and 2 of the drawing, the main portion of the vessel 25 may be made in the form of a metal cylinder. The outer end of the vessel is closed by a cap 27 which is made of the desired low fusion material. There are many alloys which are suitable for forming a closure cap which will melt at a temperature of 300° Fahrenheit. One preferred alloy is preferably composed of 19% bismuth, 38% lead and 43% tin. As an alternative, zinc may be substituted for the lead ingredient of the alloy.

The vessel 25 is preferably in the form of a cylindrical cartridge and is inserted into an open bore 28 formed in the end portion of the journal 10. The bore is preferably concentric with the axis of the journal and is formed with an annular groove 29. A split resilient ring 30 is inserted in said annular groove and engages the outer end of the lubricant filled cartridge 25 so as to hold it in place within the open bore 28.

If conditions develop which bring about an overheating of the journal 10, for example, if the journal is heated to the fusion temperature of the metal cap 27, the fusible cap will melt and thereby rupture so as to release the auxiliary supply of lubricant 26. The lubricant thus released will flow onto the packing material within the journal box 13 and be thereby brought into contact with the journal 10 and bearing 11. The rotation of the journal will also serve to throw portions of the released lubricant outwardly by centrifugal force and thereby bring it into direct contact with the upper elements of the journal bearing.

The said cartridge 25 preferably contains, in addition to the lubricant 26, an odoriferous substance, for example, methyl mercaptan which, when released by the rupture of the cartridge or the closure cap thereof, as the case may be, disseminates a telltale odor throughout the surrounding atmosphere and thereby serves to inform the train crew of the fact that a journal bearing is running hot. It also serves as an indicator to guide the train men to the location of the overheated bearing. If desired, the telltale odor may be released prior to the release of the auxiliary oil supply. In such case the overheated bearing may be located and the overheating thereof corrected before the auxiliary lubricant supply is released. In order to permit the release of the signal material before the lubricant is released, the storage cartridge is modified, as shown in Fig. 3, so that the lubricant and the signal material are stored in separate compartments. In the said modified cartridge, the main body 31 may be made of any suitable material and is formed preferably with an internal rib 32, which serves as a stop for a fusible closure cap 33. The cap 33 is pressed or otherwise secured in the open end of the body to seal the auxiliary oil supply 34 in the main body of the cartridge. The cap also provides one wall of a smaller compartment 35 for containing a quantity of signalling material 36. The small compartment 35 is closed by means of a fusible cap 37 made of a composition which will fuse at a lower temperature than the fusible cap 33 and thereby release the signal material in advance of the release of the auxiliary lubricant.

In order to provide a visual signal when a journal bearing is overheated a material adapted to generate a quantity of smoke when it is exposed to the atmosphere, for example titanium tetrachloride, may be introduced into the body of auxiliary lubricant along with the methyl mercaptan or it may be enclosed either with or without the methyl mercaptan in the separate compartment 35 of the cartridge shown in Fig. 3 so as to be released prior to the release of the auxiliary lubricant.

While the cartridge of auxiliary lubricant and/or signal producing material, according to the present disclosure, is enclosed in an open bore formed in the journal 10, other forms of containers and arrangements may be made without departure from the spirit of the invention. The invention, therefore, contemplates all such changes in form of storage vessel and its location which come within the scope of the appended claims.

I claim:

1. In combination with a railway car journal bearing structure and means including a body of absorbent material normally impregnated with a lubricant and positioned to apply said lubricant to said structure; of means defining a closed vessel arranged in close relation to the journal bearing structure at a location above said body absorbent material and provided with fusible portions adapted to melt when the journal bearing structure is heated to a predetermined temperature; one of said fusible portions comprising a partition forming two compartments in said vessel, one for containing an auxiliary supply of lubricant for said absorbent material and one for containing a signal producing substance and another fusible portion providing a closure for the last mentioned compartment.

2. In combination with a railway car journal structure and means including a body of absorbent material normally impregnated with lubricant and positioned to apply said lubricant to said structure; of means defining a closed vessel arranged in close relation to the journal bearing structure at a location above said body of absorbent material and provided with fusible portions adapted to melt when the journal bearing structure is heated to a predetermined temperature; one of said fusible portions comprising a partition forming compartments in said vessel, one for containing an auxiliary supply of lubricant for said absorbent material and one for containing a signal producing substance and another fusible portion providing a closure for the last mentioned compartment, and means located within said vessel and defining a stop for limiting inward movement of said partition.

3. In combination with a railway car axle journal formed with a chamber extending axially of the journal and opening through the end face thereof, a journal bearing structure, means including a body of absorbent material normally impregnated with a lubricant and having contact with the journal for applying said lubricant to said bearing structure, a container for containing an auxiliary supply of lubricant fitted in said axial chamber with the outer end of the container positioned inwardly from but in close relation to the open end of said chamber, and means positioned in said chamber for removably securing said container in fixed position therein and providing a passage to the open end of said chamber; a portion of said container adjacent the open end of said chamber being fusible at a predetermined temperature of the journal, whereby the auxiliary lubricant is released from said container and thrown by centrifugal force onto the bearing structure to cool the same and onto the absorbent material to supply needed lubrication and to flush foreign matter from the journal contacting surface of said absorbent material.

CHARLES P. LEESE.

REFERENCES CITED

The following references are of record in the file of this patent:

UNITED STATES PATENTS

| Number | Name | Date |
|---|---|---|
| 1,979,875 | Faus | Nov. 6, 1934 |
| 2,025,343 | Oelkers | Dec. 24, 1935 |
| 2,126,129 | Moore | Aug. 9, 1938 |
| 2,153,692 | Hyatt | Apr. 11, 1939 |
| 2,203,051 | Green | June 4, 1940 |

FOREIGN PATENTS

| Number | Country | Date |
|---|---|---|
| 67,139 | Germany | 1893 |
| 311,644 | Great Britain | May 16, 1929 |

OTHER REFERENCES

Railway Mechanical Engineer, Issue April 1946, pages 186-188 and 193.